United States Patent [19]
Thyssens

[11] 3,961,143
[45] June 1, 1976

[54] MULTI-FREQUENCY SIGNALLING SYSTEM

[75] Inventor: Guido Maria Josepha Benedikt Thyssens, Wilrijk, Belgium

[73] Assignee: International Standard Electric Corporation, New York, N.Y.

[22] Filed: Sept. 11, 1974

[21] Appl. No.: 505,014

[30] Foreign Application Priority Data
Sept. 12, 1973 Netherlands.................... 7312548

[52] U.S. Cl. ........................................ 179/84 VF
[51] Int. Cl.² .................................... H04M 1/50
[58] Field of Search.................. 179/84 VF, 84 R; 340/171 R, 171 A

[56] References Cited
UNITED STATES PATENTS
| | | | |
|---|---|---|---|
| 3,072,747 | 1/1963 | Stallworthy | 179/84 A |
| 3,128,349 | 4/1964 | Boesch | 179/84 VF |
| 3,539,731 | 11/1970 | Legedza | 179/84 VF |

*Primary Examiner*—Kathleen H. Claffy
*Assistant Examiner*—Joseph A. Popek
*Attorney, Agent, or Firm*—J. B. Raden; D. P. Warner

[57] ABSTRACT

A multi-frequency receiver is provided as part of a system able to evaluate the presence of 2 out of 5 signals and which incorporates 5 channel paths each including a parallel resonant circuit each of which is tuned to a distinct one of the frequencies of the 5 signals. In each channel path a first and second detection circuit is coupled to the corresponding resonant circuit and reacts when the voltage at the coupling point is larger than a respective common first or second threshold voltage, the second of which is larger than the first one. When spurious signals are received, at least one of the first detection circuits will react and the 2 out of 5 evaluation circuit is blocked. When a second detection circuit in a channel path reacts, the effect of the first one in this channel path is inhibited. Only signals having a well determined frequency combination are evaluated.

19 Claims, 5 Drawing Figures

MULTI-FREQUENCY SIGNALLING SYSTEM

BACKGROUND OF THE INVENTION

1. Field of the Invention

The present invention relates to a multiple-frequency signalling system including multiple-frequency sender means which are coupled to multiple-frequency receiver means via a transmission path. The sender is adapted to generate a plurality of alternating signals having different frequencies. The receiver means includes an evaluating circuit to evaluate the presence of a predetermined number of said alternating signals received by said receiver means. Said receiver means further including a plurality of channel paths each including a filter tuned to a frequency of said alternating signals and inhibiting means which render said channel paths ineffective upon spurious signals being applied to them. The channel path being rendered effective when simultaneously said channel path receives a signal having a frequency equal to that to which the filter included in this channel path is tuned and said evaluating circuit evaluates a said predetermined number of alternating signals.

2. Description of Prior Art

Such a system is known from the U.S. Pat. No. 3,072,747. Therein digits are each transmitted in the form of a combination of two alternating signals out of a plurality of six such signals. The inhibiting means included in each channel path of this system comprise an additional filter or rejector circuit accepting said plurality of frequencies but having a rectified output which is in opposition to the rectified output of the filter included in this channel path and tuned to a particular one of this plurality of frequencies. In this known system, when spurious signals are received by the receiver means the rejector circuit of each channel path rectified output of this circuit overrides that of the tuned filter included in this path and inhibits the latter. While the use of such rejector circuits enables the elimination of the effect of spurious signals, it entails the use of supplementary band-stop filters to receive the above combinations of frequency signals. Indeed, without such band-stop filters a reception of a combination of for instance two frequency signals having frequencies F1 and F2 will cause an erroneous operation of the receiver means since although the frequency signal with frequency F1 is correctly received by the filter tuned to this frequency, the rejector circuit included in the same channel path as this filter will treat the signal of frequency F2 as a spurious signal and consequently render this channel path ineffective due to the rectified output of the rejector circuit overriding that of the tuned filter. Such an erroneous operation is however eliminated by the use of a band-stop filter tuned to the frequency F2 preventing the frequency signal having this frequency F2 from reaching the rejector circuit. However, it is not necessary to use a band-stop filter per combination since these combinations of two frequency signals are grouped in such a way that each group has a particular frequency in common, it being thus possible to use one band-stop filter per group of combinations. This band-stop filter is tuned to the common frequency of the group and precedes a group of channel paths each including a filter tuned to a distinct non-common frequency of the combinations of that group.

Table 2 of the above mentioned U.S. patent shows the grouping of frequencies in four groups. Each of these groups contains a common or band-stop filter frequency F2; F3; F4; F5 and noncommon or acceptor frequencies F1, F3, F4, F5; F1, F5, F6; F1 F3; F1, F4, F6 respectively. Therefrom it follows that the number of tuned filters and consequently the number of channel paths is much larger, more particularly twice as large as the number (6) of acceptor frequencies. It can easily be seen that this large number of channel paths is due to the introduction of rejector circuits and the accompanying band-stop filters. Indeed, it is obvious that in order to be able to receive, for instance, the combinations of frequency signals F1, F1 and F3, F1 it necessitates the presence of at least two filters tuned to the frequency F1. As mentioned above, each of the twelve channel paths moreover includes an additional filter or rejector circuit, while each of the four groups of tuned filters is preceded by a band-stop filter.

SUMMARY OF THE INVENTION

From the above it follows that the known system includes a relatively large number of filters which have moreover to be of good quality to assure good stability and which are therefore relatively expensive.

It is therefore an object of the invention to provide a multiple-frequency signalling system of the above type wherein less such filters are needed.

The present multiple-frequency signalling system is characterized in that the inhibiting means included in each of said channel paths include a detection circuit coupled between the tuned filter included in this path and said evaluating circuit and able to compare a voltage value provided by this filter with a threshold voltage value, said detection circuit being able to react when the difference between the compared voltages reaches a predetermined value, and that the operation of said evaluation circuit is prevented when at least one of said detection circuits reacts, thus rendering said channel paths ineffective.

In this way, by using no rejector filters the tuned filters in each of the channel paths pass the frequency to which they are tuned when spurious signals of a broad spectrum are received and at least one detection circuit coupled to the corresponding tuned filter will react when the voltage value at this tuned filter is larger than said threshold voltage value. Since no rejector filters are required also no band-stop filters are needed. As mentioned above, the introduction of these rejector and band-stop filters entails the necessity to have a number of channel paths larger than said plurality of frequency signals. This number can thus be reduced by eliminating the above mentioned filters. Moreover, the presence of one detection circuit per channel path and of an evaluating circuit able to evaluate the presence of said predetermined number of frequency signals permits to use one channel path per frequency signal so that also the number of tuned filters is reduced.

BRIEF DESCRIPTION OF THE DRAWINGS

The above mentioned and other objects and features of the invention will become more apparent and the invention itself will be best understood by referring to the following description of embodiments taken in conjunction with the accompanying drawings in which.

DESCRIPTION OF PREFERRED EMBODIMENTS

Figure 1:
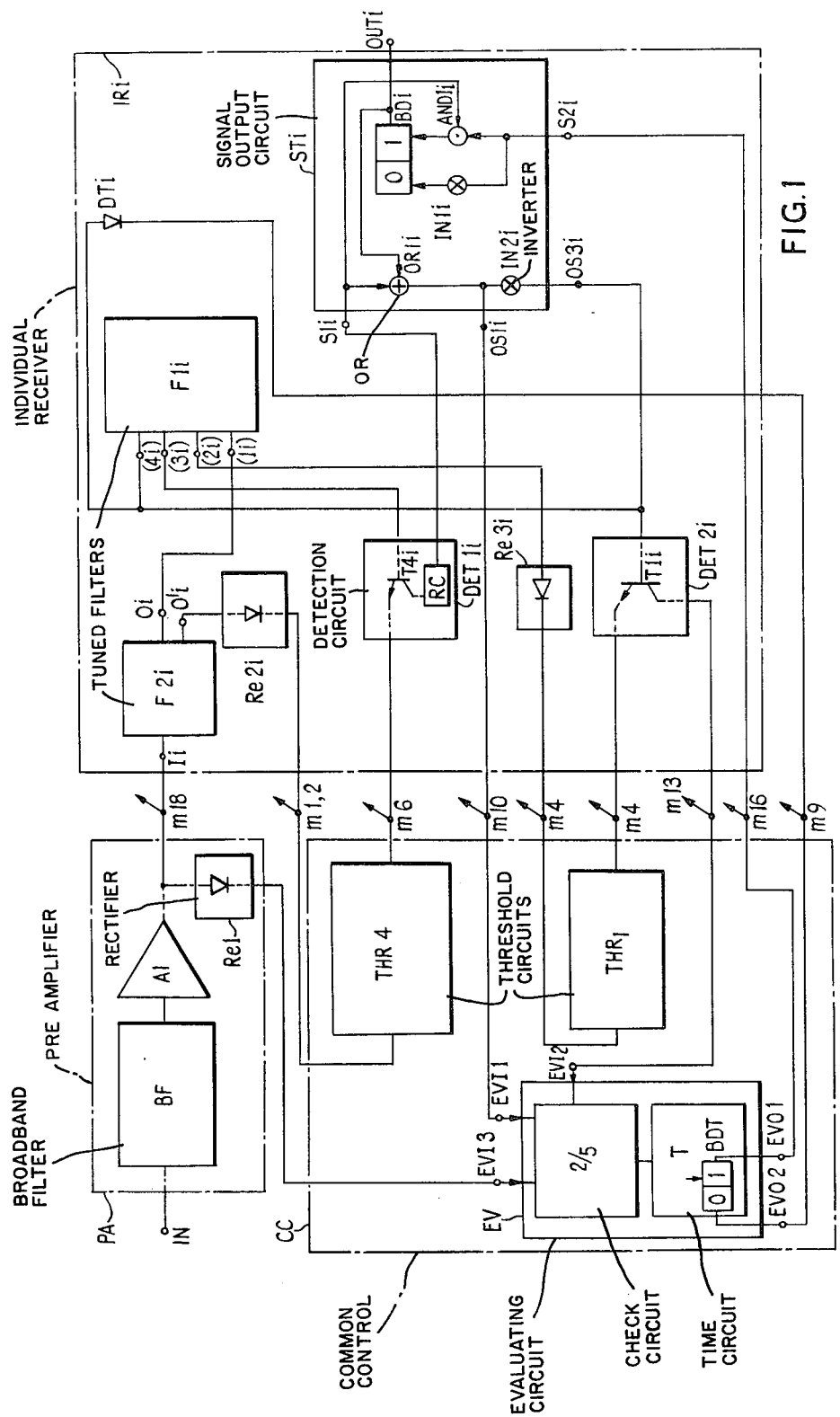
FIG. 1 is a block diagram of a receiver forming part of a signalling and detection system according to the invention.

Principally referring to FIG. 1, the receiver shown therein forms part of a multiple frequency signalling system such as described in the Belgian patent 646,658 (G. Thyssens-2) and in the article "Interregister Multifrequency-code signalling for telephone switching in Europe" of M. den Hertog published in "Electrical Communication" vol. 38, No. 1, 1963. Digit or other information is transmitted by means of a combination of a number of frequencies selected from a plurality of available frequencies. For example, each digit information may be transmitted by means of two signals each having a frequency chosen out of a group of five voice frequencies f1 to f5. These combinations have to be recognized by the receiver. This receiver includes a common pre-amplifier PA and control circuit CC and five channel paths or individual receivers IRi for each of the five frequencies fi ($i = 1$ to 5).

The input signals at the input terminal IN are fed to each individual receiver IRi via the multiple connection m18 after amplification in the pre-amplifier PA. This pre-amplifier includes mainly a non-selective broadbandfilter BF, an amplifier A1 and a rectifying circuit Re1.

The common control circuit CC includes an evaluating circuit EV having input terminals EVI1 to EVI3 output terminals EVO1, EVO2 and two threshold circuits THR1 and THR4. The evaluating circuit EV includes a 2 out of 5 check circuit 2/5 and a time circuit T. This time circuit T includes among others a bistate device BDT, the 1 and 0 outputs of which are connected to the output terminals EVO1 and EVO2 respectively. By means not shown in this Figure the bistate device BDT is set to its 1-state thus providing an output signal a time interval T' after the 2 out of 5 check circuit 2/5 has been activated i.e. when an input signal has been provided at the input terminal EVI3 and when two input signals have been provided at the input terminal EVI1 as will be explained later. Each individual receiver IRi includes tuned filters F1i, F2i, rectifying circuits Re2i, Re3i, detection circuits DET1i, DET2i and a signal output circuit SIi having input terminals S1i and S2i and output terminals OS1i, OS3i and OUTi. Each filter F1i has an input and output terminals 1i and 2i, 3i, 4i respectively whilst each filter F2i has an input terminal Ii and output terminals Oi and O'i. These filters F1i and F2i are tuned to the corresponding frequency fi (f.i. Filters F11 and F21 are both tuned to the frequency f1. The detection circuits DET1i and DET2i are symbolically represented by detection transistors T4i and T1i respectively. The output terminal of the amplifier A1 is coupled to the input terminal EVI3 of the evaluating circuit EV via the rectifying circuit Re1 on the one hand and to the input terminal (Ii) of tuned filter F2i via the multiple connection m18 on the other hand. The output terminal O'i of filter F2i is coupled to the emitter of transistor T4i via rectifying circuit Re2i, threshold circuit THR4 and multiple connections m1, 2 and m6 whilst the output terminal Oi is connected to the input terminal 1i of filter F1i. The collectors of transistors T4i and T1i are coupled to the input terminal EVO2 of the signal output circuit SIi via a resistance capacitance time circuit RC and to the input terminal EVI2 of the evaluation circuit EV via the multiple connection m13 respectively. The base of the transistor T4i is coupled to the output terminal (3i) of tuned filter F1i whilst the base of transistor T1i is coupled to the output terminal OS3i of SIi on the one hand and to the output terminal (4i) of filter F1i on the other hand. This output terminal (4i) is also coupled to the output terminal EVO2 of the evaluation circuit EV via diode D7i and multiple connection m9. The output terminal (2i) of filter F1i is coupled to the emitter of transistor T1i in detection circuit DET2i via the rectifying circuit Re3i multiple connection m4 and threshold circuit THR1. The input terminal S2i of SIi is connected to the output terminal EVO1 of EV via the multiple connection m16. The output terminal OS1i of SIi is coupled to the input terminal EV1 of EV via the multiple connection m10. The signal output circuit SIi shown is a logical equivalent of the circuit part SIi shown in FIG. 2 and includes the bistate device BDi, OR-gate OR1i, AND-gate AND 1i, and inverters IN1i and IN2i connected as shown.

The receiver operates as follows. It is supposed that two signals having frequencies f1 and f2 are received at the input terminal IN of the pre-amplifier PA. The frequencies f1 and f2 are 2 out of the 5 frequencies fi ($i = 1$ to 5) previously mentioned. The amplified signals f'1 and f'2 are fed to the input terminals (11) and (12) of the tuned filters F11 and F12 via the tuned filters F21 and F22 respectively. These tuned filters F11, F21 and F12 and F22 form part of the individual receivers IR1 and IR2 respectively. IR1 and IR2 are two individual receivers out of the five receivers IR1 to IR5 mentioned above and include the detection circuits DET11, DET12, DET21, DET22, the rectifying circuits Re21, Re22, Re31, Re32 and signal output circuits SI1 and SI2 respectively. Only the receiver IRi is shown since all receivers IR1 to IR5 have a similar composition. The only difference being that each filter IRi is tuned to the corresponding frequency fi. In what follows i will have the values 1 and 2 unless otherwise specified The above signals f'1 and f'2 are also rectified in the rectifying circuit Re1 which provides a rectified input signal at the input terminal EVI3 of the 2 out of 5 check circuit. As explained later, the evaluation circuit EV starts operating when simultaneously signals are fed to its input terminals EVI3 and EVI1. Since the broadband filter BP, which passes the input signals for the transmission of digit information is non selective it passes also noise signals due to short interruptions or vibrations of contact in the transmission path. Consequently during these contact vibrations the input EVI3 of EV remains activated, so that this evaluation circuit may start operating immediately after these contact vibrations stop. The evaluation circuit EV will be deactivated and thus be unable to operate only when no input signal is present at the input terminal FN during a sufficiently long time interval. The rectified output signals provided by the rectifying circuits Re2i are fed to the threshold circuit THR4 which supplies a threshold voltage value Tr4 at the emitters of transistor T4i of the detection circuit DET1i. Similarly the rectified output signal provided by the rectifying circuits Re3i are applied to the threshold circuit THR1 which supplies a threshold voltage value Tr1 to the emitter of the transistor T1i of the detection circuit DET2i ($i = 1$ to 5). The threshold voltage value Tr1 is smaller than the value Tr4 the difference being of the order of 10dB. It should be remarked that the output level of the output signals at the output terminals 2i to 4i ($i = 1$ to 5) increases in the same order and that the signal supplied to the threshold circuit THR1 is taken at the lowest output level whilst the bases of transistors T1i ($i = 1$ to 5) are connected to the output terminal (4i) ($i = 1$ to 5) supplying the highest output level, thus increasing the sensibility of the detection circuits DET2i ($i = 1$ to 5). When now transistors T4i, conduct due to the fact that the output voltages at the output terminals (3i) produced at the reception of the signals with frequencies fi are higher than the threshold voltage value Tr4, one of the inputs of the 2-input OR1i and the 2-input AND-gates AND1i will be activated. The time constant circuit RC in the collector circuit of transistor T4i serves to maintain high the inputs of the above gates during the time interval the base voltage value decreases below the threshold voltage value Tr4. If f.i. the frequency of the lowest signal is 540 Hz, the time constant of this RC circuit must be larger than 2 milliseconds. Since the outputs of the OR-gates OR1i are high two input signals are provided at the input terminal EVI1 of the evaluating circuit EV. Transistors T1i are inhibited by the inverted outputs of the above OR-gates. The 2 out of 5 check circuit 2/5 now starts operating provided that in the other individual receivers IRi ($i = 3, 4, 5$) no signals applied to the bases of transistors T1i ($i = 3, 4, 5$) have a voltage value which is above the lower threshold voltage value Tr1. In this case the bistate device BDT will be set to its 1-state and the time circuit T will deliver an output signal at the output terminal EV0 a time interval T' after the start of operation of the 2 out of 5 check circuit. This output signal will cause the activation of the outputs of the AND gates AND1i since their other inputs are still activated. The bistate devices BDi are set to the 1-state so that simultaneously their 1-outputs are supplying two input signals at the input terminals EVI1 of EV via the OR-gates OR1i and are maintaining the transistors T1i in the non conductive state. The output terminals 4i ($i = 1$ to 5) of the filters F1i ($i = 1$ to 5) are short circuited via the diodes D7i ($i = 1$ to 5) due to the fact that the 0-output of the bistate devices BDT is low. The reason of this short circuiting will be explained below. The output terminals OUTi of the respective signal output circuits SIi are maintained high and this state may now be recognized by a computer not shown. By means not shown a coded signal is sent in backward direction from the receiver to the sender and when the sender recognizes this coded signal the emission of coded signals in forward direction is stopped. Consequently, the input signal at the input terminal EVI3 of EV will disappear and the evaluation circuit is prevented from operating. The bistate devices BD1i will be reset via the inverters IN1i since now also the bistate device BDT has been reset.

It should be noted that in the above case when transistors T4i conduct but when in at least one of the individual receivers IRi ($i = 3, 4, 5$) the voltage value of the signal fed to the base of the corresponding transistor T1i is larger than the threshold voltage value Tr1, the evaluation circuit EV will be prevented from operating, so that in this case no output signals are able to appear at the output terminals OUTi.

The receiver shown on FIG. 1 will now be described in detail reference being made to FIGS. 2 and 3.

Figure 2:
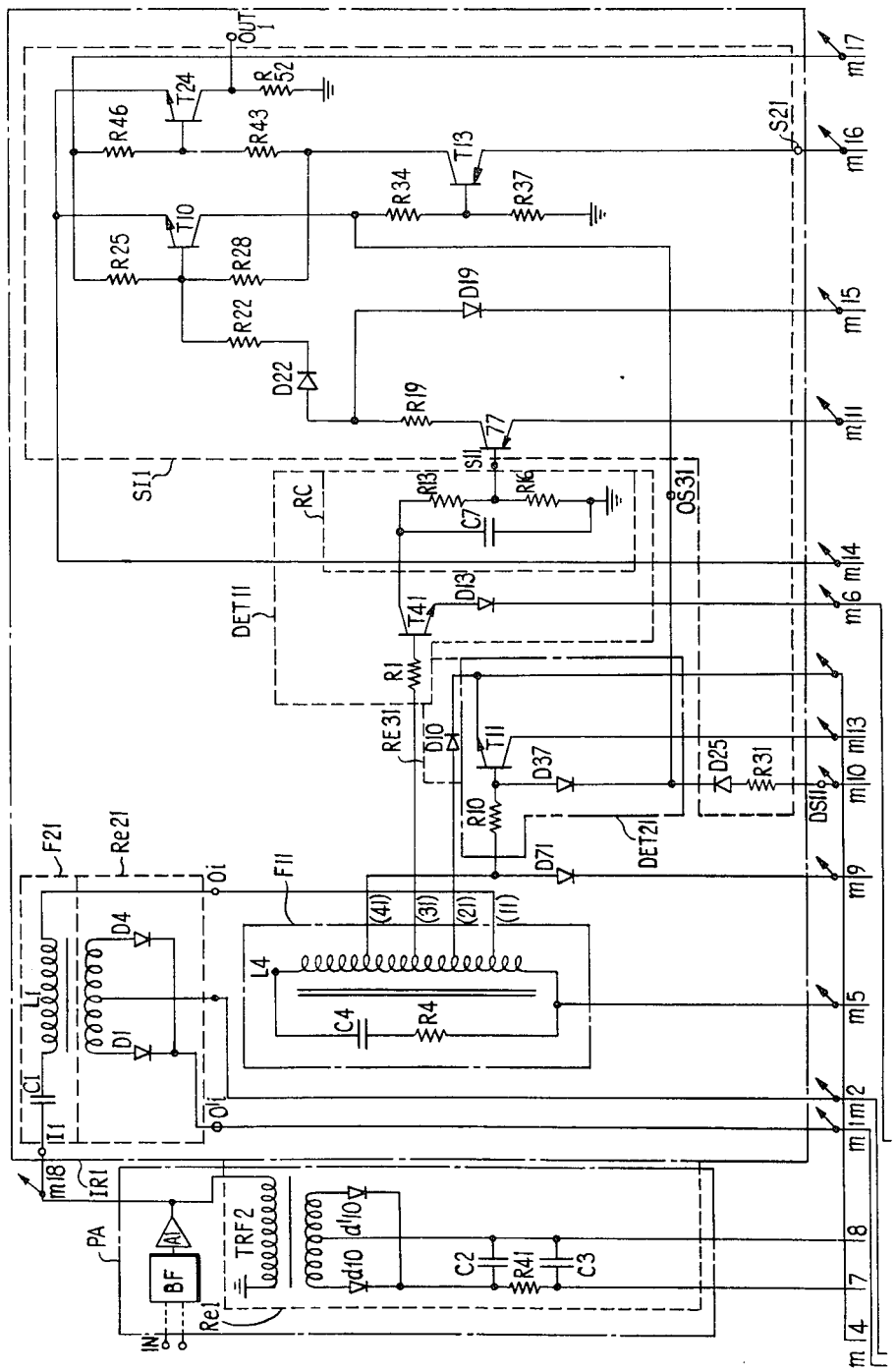
FIG. 2 and FIG. 3 show detailed circuits of the above receiver.

Principally referring to FIG. 2 the parts shown therein include the common pre-amplifier PA and the individual receiver IR1. In PA the input terminals IN are connected via the broadbandfilter BF and the amplifier A1 to the rectifying circuit Re1 on the one hand and to the input terminal I1 of the filter F21 via the multiple connection m18 on the other hand. The rectifying circuit Re1 includes the transformer TRF2, diodes d10 and d'10 connected in a known manner and the filternetwork constituted of the capacitors C2, C3 and resistor R41. This filternetwork is connected to the common control circuit CC (FIG. 3) via the wires 7 and 8. The tuned filter F21 in the individual receiver IR1 is a series resonant circuit tuned to the frequency f1 and includes the capacitor C1 and inductor L1. The rectifying circuit RE21 with diodes D1 and D4 is transformer coupled to the above resonant circuit on the one hand and is connected to the control circuit CC via the multiple connectionss m1, m2 on the other hand. The filter F11 is a parallel resonant circuit (L4, C4, R4) tuned to the same frequency f1. The filters F1i ($i = 1$ to 5) which are also parallel resonant circuits arre tuned to the corresponding frequency fi and include each a resistor such as R4. These resistors R4 are used to adjust the quality factors Qi ($i = 1$ to 5) such that in all tuned circuits F1i ($i = 1$ to 5) the ratio of Qi to the frequency fi is a constant for reasons which will become apparent below. As shown later, the junction point of inductor L4 and the resistor R4 is connected to a reference voltage in the common control circuit CC via the multiple connection m5. The rectifying circuit Re21 is coupled to the series resonant tuned circuit rather than to the parallel resonant circuit in order not to amortize the latter since this parallel circuit is a very selective one. The output terminal (41) of the parallel resonant circuit is connected to the control circuit CC via diode D71 and multiple connection m9 on the one hand and to the junction point of the base of the npn transistor T11 and the anode of diode D37 via resistor R10 in the detection circuit DET21 on the other hand. The junction point of the cathodes of the diodes D37 and D25 is connected to ground via the series connected resistors R34 and R37 and to the collector of transistor T10 in the signal output circuit SI1 on the one hand and to the control circuit CC via diode D25, resistor R31 and multiple connection m10 on the other hand. The emitter of transistor T11 is connected to the output terminal (21) via diode D10 in the rectifying circuit Re31 on the one hand and to the control circuit CC (FIG. 3) via the multiple connection m4 on the other hand. The output terminal (31) of F11 is connected to the control circuit CC (FIG. 3) via the following circuit: resistor R7, base-emitter circuit of npn transistor T41 and protecting diode D13 in the detection ciircuit DET11 and multiple connection m6. The collector of T41 is grounded via the resistance capacitance network RC including the capacitor C7 and the series connected resistors R13 and R16. The emitter and base of transistor T7 are connected to CC via the multiple connection m11 and to the junction point of resistors R13 and R16 respectively, the collector of T7 is connected to the junction point of the anodes of diodes D22 and D19 via resistor R19. This junction point is connected to CC via diode D19 and multiple connection m15 on the one hand and to the junction point of the base of transistor T10, resistors R25 and R28 via diode D22 and resistor R22 on the other hand. The bases of transistors T10 and T24 are connected to the control circuit CC via the respective resistors R25 and R46 and multiple connection m17 on the one hand and via the respective resistors R28, R43, collector-emitter circuit of transistor T13 and multiple connection m16 on the other hand. The base of this transistor T13 is connected to the junction point of resistors R34 and R37. The collector of transistor T24 forms the output terminal OUT1 and is earthed via resistor R52. Both emitters of transistors T10 and T24 are connected to the control circuit CC via the multiple connection m14.

Figure 3:
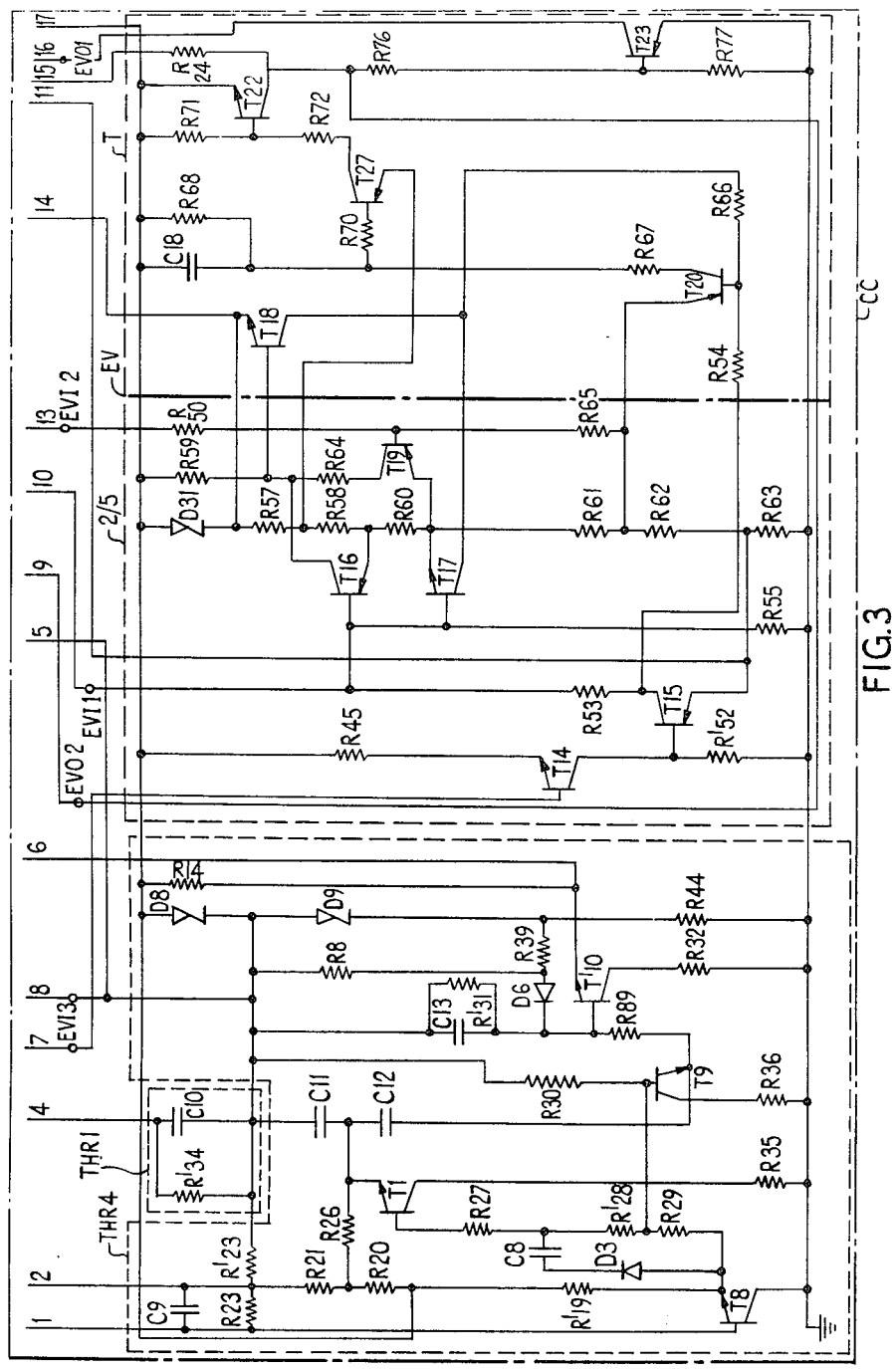

Principally referring to FIG. 3 the circuit shown therein is the common control circuit CC. A potentiometer circuit in the 2 out of 5 check circuit 2/5 is branched between battery and ground and includes the Zener diode D31 and resistors R57, R58, R60, R61, R62 and R63. The bases of pnp transistor T16 and npn transistor T17 are both connected to ground via the parallel connection of the resistor R55 and of the resistor R53, collector-base circuit of pnp transistor T15 and resistor R63 on the one hand and to the multiple connection m10 on the other hand. The base of transistor T15 is connected to the junction point of resistor R'52 and of the collector of npn transistor T14, the emitter of which is connected to battery via resistor R45. The base of this transistor T14 is connected to the rectifying circuit Re1 via the wire 7. It should be noted that in the case when transistor T15 is conductive the resistance of the series branch including the resistors R53, R63 and the collector-base circuit of transistor T15 is equal to the resistance of resistor R55 and that the resistance values of the resistors R31 in the detection circuits DET 2i ($i = 1$ to 5) (FIG. 2) are such that the voltage at the bases of transistors T16 and T17 is half the battery voltage when two such resistors are each connected to the cathode of Zener diode D31 via a conductive transistor T10 a conductive diode D25 and multiple connection m14. As explained below, the transistor T10 becomes conductive when a signal is applied to the base of transistor T41 which is larger than the threshold voltage value Tr4, when only one resistor R31 or more than two such resistors are connected through i.e. when the bases of transistors T16 and T17 are connected to the cathode of Zener diode D31 via only one resistor R31 or more than two such resistors, the voltage at the bases of transistors T16 and T17 will be different from half the battery voltage. The emitter of transistor T16 is connected to the junction point of resistors R58 and R60 such that its emitter voltage is smaller than half the battery voltage. Similarly, the emitter of transistor T17 is connected to the junction point of resistors R60 and R61 such that the emitter voltage is larger than half the battery voltage. Consequently, only in the case when two resistors R31 are connected through the transistors T16 and T17 are non conductive. The collector of transistor T16 is connected to the junction point of resistors R64, R59 and the base of npn transistor T18 in the time circuit T whilst the collector of transistor T17 is connected to the collector of transistor T15 via the series connected resistors R54, R66 in the time circuit T on the one hand and to the collector of transistor T18 on the other hand. The series connection of the collector-emitter circuit of pnp transistor T19, resistors R64 and R59 is branched between the emitter of transistor T17 and battery. The base of T19 is connected to the junction point of the resistors R62, R61 and the emitter of pnp transistor T20 in the time circuit T via resistor R65 on the one hand and to the multiple connection m13 via resistor R50 on the other hand.

In the time circuit T the emitter of transistor T18 is connected to the cathode of Zener diode D31 on the one hand and to the multiple connection m14 on the other hand. The base of transistor T20 is connected to the junction point of resistors R54 and R66. The junction point of the resistance capacitance time circuit C18, R68 and the collector resistor R67 is connected to the base of pnp transistor T27 via resistor R70. The emitter of this transistor T27 is connected to the junction point of resistors R57, R58 of the potentiometer circuit including diode D31 whilst its collector is connected to battery via the series connected resistors R72 and R71. The junction point of resistors R71, R72 is connected to the base of npn transistor T22, the emitter of which is earthed. On the one hand the collector of this transistor T22 is earthed via the series connected resistors R76, R77 whilst on the other hand this collector is connected to the multiple connections m9 and m15, the latter via resistor R24. The junction point of resistors R76 and R77 is connected to the base of transistor T23, the emitter of which is earthed. The collector of this transistor is connected to the multiple connection m16.

As explained above, when the voltage at the bases of the transistors T16, T17 is half the battery voltage neither transistor T16 nor transistor T17 is conductive. If however the voltage at their bases decreases below or increases beyond half the battery voltage either transistor T16 or transistor T17 becomes conductive respectively.

It is now supposed that transistor T16 becomes conductive due to the fact that f.i. more than two resistors R31 have been connected through. As a consequence thereof transistor T18 will conduct due to its base voltage becoming larger than the Zener voltage determined by the Zener diode D31. This transistor allows collector current to flow from ground to the cathode of the Zener diode D31 in the following circuit: R63, emitter-collector circuit of transistor T15 which is supposed to be conductive, resistors R54, R66, collector-emitter circuit transistor T18, cathode D31. Consequently, transistor T20 becomes conductive due to its base voltage being decreased below its emitter voltage determined by the junction point of the resistors R61, R62 included in the above mentioned potentiometer circuit. The capacitor C18 of the resistance capacitance time circuit C18, R68 is thus able to be charged via the conductive transistor T20 at the emitter voltage of this transistor. Transistor T27 is now blocked since when the capacitor C18 is charged its base voltage is higher than its emitter voltage. Therefrom it follows that transistors T22 and T23 are equally in the non conductive state.

If it is supposed that transistor T17 becomes conductive due to the fact that f.i. only one resistor R31 has been connected through, transistor T20 will become conductive. Indeed, due to transistor T17 receiving collector current from ground in the following circuit: resistor R63, conductive transistor T15, resistors R54, R66, collector transistor T17. The base voltage of transistor T20 decreases below its emitter voltage. In this case, as well as in the foregoing one, capacitor C18 is charged and transistors T27, T22, T23 will remain blocked.

If however transistors T16 and T17 are blocked due to the fact that two resistors R31 are connected through as explained above, transistors T18 and T20 will also be blocked and the/capacitor C18 is discharged via resistor R68. After a time interval T' the voltage at the base of transistor T27 decreases below its emitter voltage and this transistor, as well as transistors T22 and T23 become conductive. It should be remarked that even when transistors T16 and T17 are blocked, transistor T18 and consequently transistor T20 can be made conductive when transistor T19 is brought into the conductive state. As will be shown below, this transistor T19 can be made conductive when at least one of the detection circuits DET2i ($i = 1$ to 5) detects a voltage value above the threshold voltage value Tr1.

The threshold circuit THR1 is constituted of the resistance capacitance network R'34, C10 connected between the cathode of Zener diode D8 and the multiple connection m4.

In the threshold circuit THR4 the following potentiometer circuits should first be considered:
1. Zener diode D8, Zener diode D9, resistance R44 connected between ground and battery;
2. Resistances R'23, R21, R20 branched across the Zener diode D8;
3. Resistances R39 and R88 branched across the Zener diode D9. The Zener voltage VZ8 of the Zener diode D8 is larger than the Zener voltage VZ31 of the Zener diode D31 of the 2 out of 5 check circuit whilst the Zener voltage VZ9 of D9 is equal to that of D8. Typical values are VZ8 = VZ9 = 6V VZ31 = 3V.

The input terminals of the resistance capacitance filter network C9, R23 are connected to the multiple connections m1 and m2 via the wires 1 and 2 respectively whilst the output terminals of the above filter network are connected to the junction point of the resistors R'23 and R21 on the one hand and to the base of npn transistor T8 on the other hand. The collector of T8 is earthed whilst its emitter is connected to battery via resistor R'19 on the one hand and the base of npn transistor T1 via resistor R27 and the parallel circuit including the diode D3, capacitor C8 and resistors R29 and R'28 connected as shown. The collector of T1 is earthed via resistor R35 whilst its emitter is connected to the junction point of resistors R21 and R20 via resistor R26 on the one hand and to the cathode of the Zener diode D8 and the emitter of transistor T9 via the respective capacitor C11 and C12 on the other hand. The emitter of transistor T9 is further connected to the cathode of Zener diode D8 via resistance R89 and the resistance capacitance network C13, R'31. The junction point of resistors R29 and R'28 is connected to the base of this transistor T9 on the one hand and to the cathode of Zener diode D8 via resistor R30 on the other hand. The collector of T9 is earthed via resistor R36. The base of npn transistor T'10 is connected to the junction point of the resistors R89, R'31, capacitor C13 and the cathode of the clamping diode D6, the anode of which is connected to the junction point of the resistors R88 and R39. The emitter of transistor T'10 is connected to battery via resistor R14 on the one hand and to the multiple connection m6 on the other hand. The collector of this transistor is earthed via resistor R32.

Principally referring to FIGS. 2, 3 and 4 the operation of the receiver is described hereinafter assuming hereby that the above threshold circuits THR1 and THR4 produce the respective threshold voltage values Tr1 and Tr4 (Tr4 being larger than Tr1). The operation of the threshold circuits itself will be considered later. When two signals with frequencies f1 and f2 are received at IN, the rectifying circuit Re1 (FIG. 2) will provide an input signal at the base of transistor T14 via wire 7 since the broadband filter BF (FIG. 2) passes all signals having frequencies within the frequency range used by the signals for the transmission of the digit or other information. As a consequence thereof, the normally conductive transistor T14 increases its collector current whereby transistor T15 becomes conductive. Transistor T14 is normally conductive since the Zener voltage VZ8 is applied to its base via wire 8, transformer TRF2 and diodes d10 and d'10. Due to transistor T15 being conductive the base resistor R53 of transistors T16 and T17 is now earthed via conductive transistor T15 and resistor R63. Since no resistor such as R31 (FIG. 2) in the signal output circuits SIi ($i = 1$ to 5) have not yet been connected through the transistors T17 and consequently T20 will be both conductive so that the capacitor C18 of the resistance capacitance time circuit C18, R68 (FIG. 3) becomes charged as explained above. This capacitor remains charged as long as transistor T17 is conductive.

Supposing again that i has the values 1 and 2 unless otherwise specified, the amplified input signals f'1 having frequencies fi are also applied to the input terminals (1i) of the parallel resonant or tank circuits F1i via the series resonant circuits F2i (FIG. 1) respectively. It is further supposed that the signals, at the output terminals 3i of the respective tank circuits F1i have increased beyond the above mentioned threshold voltage value Tr4 and that the selectivity of the other tank circuit F1i ($i = 3, 4, 5$) is sufficiently high such that the signals at the output terminals 4i ($i = 3$ to 5) of these tank circuits remainn below the threshold voltage value Tr1. In what follows only the operation of one individual receiver IR1 (FIG. 2) in conjunction with the common preamplifier PA and evaluating circuit EV will be considered since the other receiver IR2 (not shown) operates in a similar way.

The following should first be noted: the junction point of resistor R4 and inductor L4 of F11 (FIG. 2) and the threshold circuits THR1 and THR4 are all connected to the cathode of the Zener diode D8 (FIG. 3) so that the voltage values of all input and output signals of the tank circuit and the threshold voltage values applied to the detection circuits are referenced to the voltage value of the cathode of the Zener diode D8 (FIG. 3).

Due to the signal at the output terminal (31) of tank circuit F11 having increases beyond the threshold voltage value Tr4 the following happens: transistor T41 becomes conductive and as a consequence thereof transistors T7 and T10 are equally brought in the conductive state (FIG. 2). Indeed, the emitter of T7 is substantially at ground potential since it is earthed via multiple connection m11 and the resistor R63 (FIG. 3) of small resistance value. Due to transistor T7 being conductive, transistor T10 (FIG. 2) is supplied with emitter current flowing in the following circuit: from earth to battery via transistor T7, resistors R19, R22 and diode D22, base-emitter circuit of T10, multiple connection m14, cathode Zener diode D31, battery. This emitter current gives rise to a collector current saturating the transistor T10 so that the potential at its collector is substantially that at the cathode of the Zener diode D31.

Figure 4:
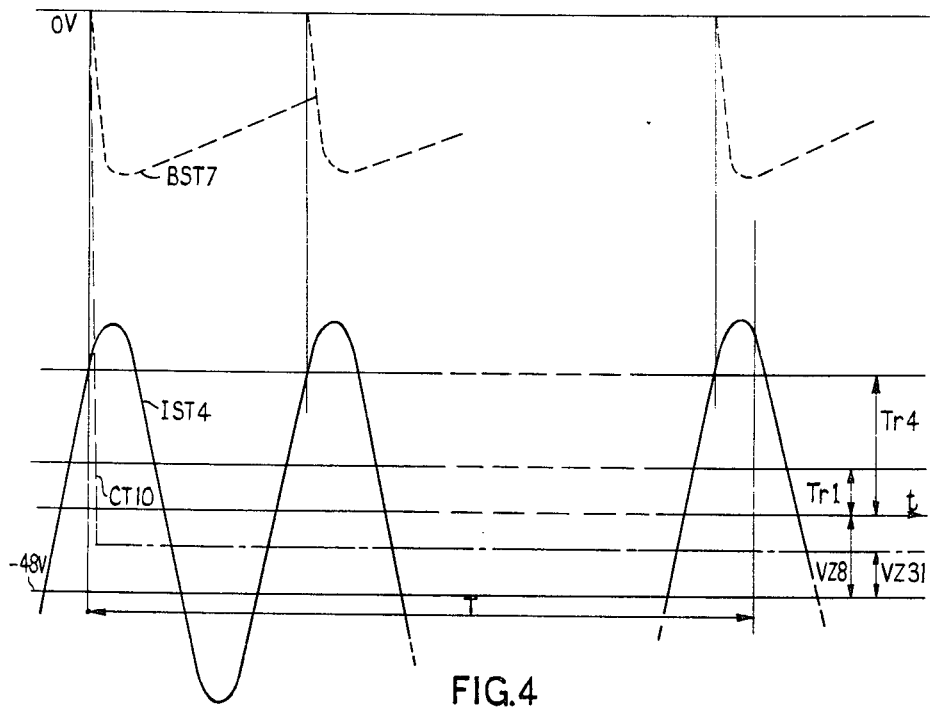
FIG. 4 is a diagram showing frequency signals which facilitate the understanding of the operation of the circuits shown in FIGS. 2 and 3.

The output voltage signal (IST4) at the output terminal (31) as well as the voltage signals at the base of transistor T7 (BST7), the collector of transistor T10 (cT10), the reference voltages VZ31, VZ8 and the threshold voltage values Tr1 and Tr4 are represented in function of time $t$ on FIG. 4.

Due to the action of the resistance capacitance time circuit C7, R13, R16, the transistor T7 (FIG. 2) remains conductive during the time interval determined by the instants separating the signal peaks above Tr4. Transistor T10 remains now saturated during the time interval T7 is conductive. Due to the above the following happens:

1. Transistor T11 in the detection circuit DET21 (FIG. 2) is blocked since its base voltage is maintained at the Zener reference voltage (VZ31) via the clamping diode D37;
2. The resistor R31 in the signal output circuit SI1 is switched through i.e. connected to the above Zener reference voltage VZ31 via the diode D25 and conductive transistor T10;
3. The 2 out of 5 check circuit 2/5 starts to operate since two resistors such as R31 have been switched through due to which transistors T16 and T17 in this check circuit are blocked and a time interval T' thereafter transistors T22 and T25 (FIG. 3) are made conductive as explained above.

As a consequence thereof the following occurs:

1. Transistor T13 and consequently transistor T24 (FIG. 2) both become conductive;
2. The part of the signal output circuit SI1 including the transistors T10, T13, T24 is isolated from the rest of the signal output circuit of the individual receiver IR1 by means of the diode D22 since the collector of transistor T7 is now fed from battery via diode D19, resistor R24 and conductive transistor T22 (FIG. 3);
3. Transistors T10 and T24 are maintained conductive since their bases are supplied with base current via transistor T13 and resistors R28 and R43 respectively;
4. The 2 out of 5 check circuit 2/5 is maintained operated since the resistors R31 in both the individual receivers IR1 and IR2 (not shown) are still switched through;
5. The tank circuit F11 is short-circuited by means of the diode D71 (FIG. 2) connected to battery via the conductive transistor T22 thus preventing the individual receivers IR1 and IR2 from reacting to disturbing signals as explained below. This short-circuiting has no effect on the state of the transistor T10, T13 and T24 in the signal output circuit SI1 and on the evaluation circuit EV since the transistors T10, T13 and T24 and T22, T23 in EV are maintained conductive.

An output signal is now provided at the output terminals OUT1 and OUT2 (not shown) of the individual receivers IR1 and IR2 (not shown). These signals may be recognized by the computer (not shown). When this has taken place backward signals are sent to the signal generator means until these backward signals are recognized. The generator means then stops the emission of forward signals so that transistor T15 (FIG. 3) becomes blocked. As a consequence thereof transistor T16 (FIG. 3) in the 2 out of 5 check circuit becomes conductive whereby finally transistors T22 and T23 both are blocked and the tank circuits F11 and F12 are no longer short-circuited. Consequently, transistors T13, T10 and T24 (FIG. 2) become blocked and the system is ready for the reception of the following new frequency code.

As mentioned before the above described operation is valid in the case none of the output terminals (3i) ($i = 3, 4, 5$) of the respective tank circuits F1i ($i = 3, 4, 5$) supply an output signal, the voltage value of which is larger than the threshold voltage value Tr1. When in either one of these tank circuits such an output signal is provided, the 2 out of 5 check circuit 2/5 will not be able to operate since the corresponding transistor T1i is then becoming conductive whereby the latter transistor receives collector current via resistors R65, R50 (FIG. 3). Due to this the transistors T19 and T18 (FIG. 3) are brought into the conductive state. As explained earlier, transistor T20 becomes conductive and the capacitor C18 is charged so that transistor T27 (FIG. 3) is then blocked so that no output signal is able to appear at any of the output terminals OUTi. It is now supposed that at the moment the receiver receives and registers a signal with frequency f1 for instance noise signals are generated on the transmission line connecting the above receiver to the sender means. A backward signal will be emitted from the receiver to the sender means but since the tank circuit F11 has been short-circuited, the above noise signals will only block the receivers at the sender side and render its 2 out of 5 check circuits inoperative. The sender means will thus continue to emit the frequency f1 since its receiver is blocked. At the ending of the noise signals the receiver at the receiver side will again receive the above frequency signal (f1) which again would be registered if tank circuit F11 had not been short-circuited since in this case the noise signals would have rendered the 2 out of 5 check circuit of the receiver inoperative. Another case wherein noise signals may give rise to a faulty condition will be described herebelow.

Figure 5:
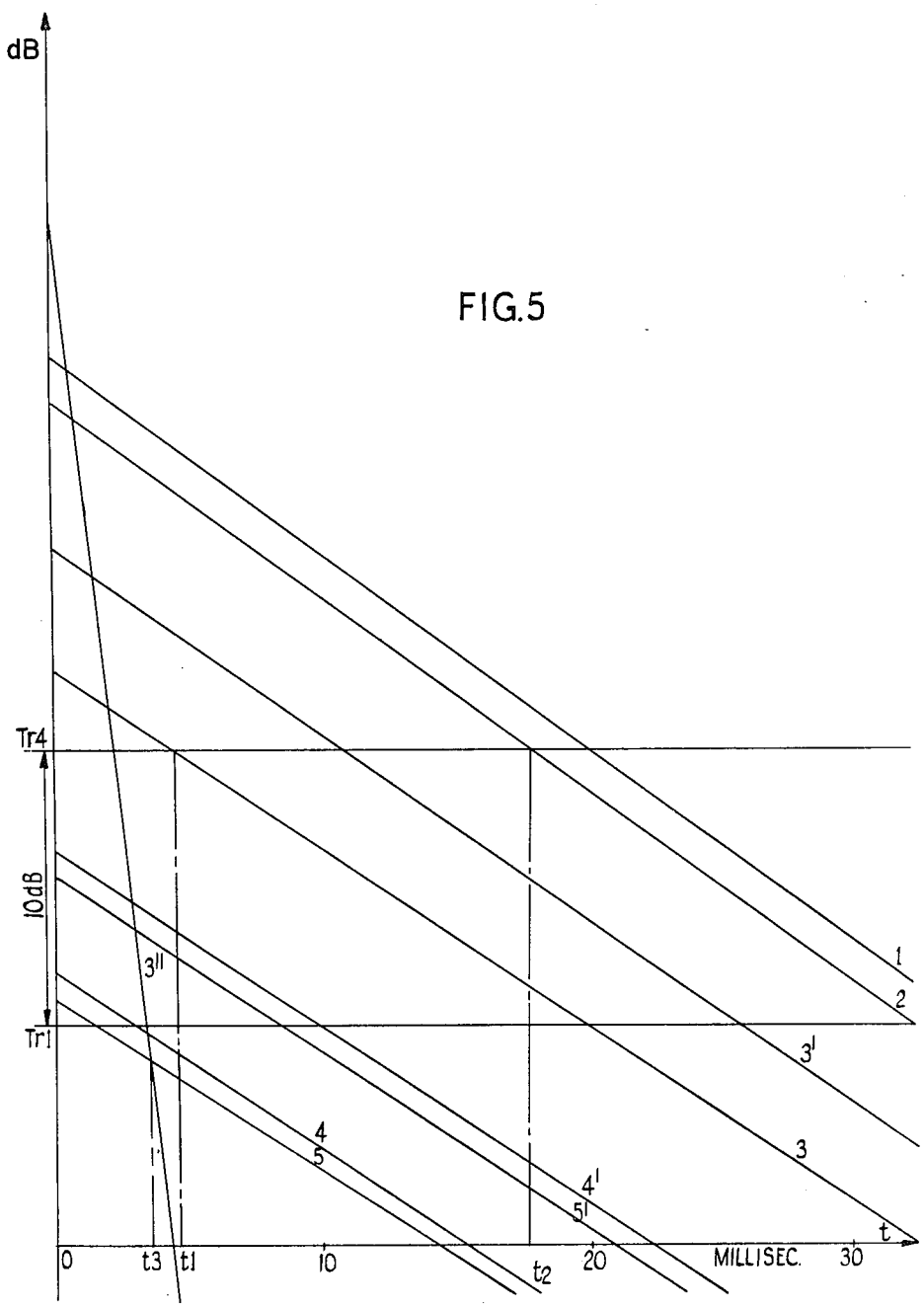
FIG. 5 is a diagram showing the envelopes of other signals capable of being produced in the circuits of FIGS. 2 and 3.

Mainly referring to FIG. 5 the lines 1 to 5 and Tr1, Tr4 shown thereon represent in a dB, time diagram envelopes of decaying output signals at the output terminals 3i ($i = 1$ to 5) of the tank circuits F1i ($i = 1$ to 5) and the threshold voltage values Tr1 and Tr4 in function of time respectively. The curves 3', 4', 5' and 3'' will be referred to later. The envelopes 1, 2, 3, 3', 4, 4', 5, 5' are parallel straight lines the necessity of which will become clear below. It is known that a resonant circuit will continue to oscillate when an input signal fed to this circuit is stopped. The amplitude of the oscillations will decay exponentially with a time constant which is proportional to the ratio of the quality factor Q and the tuned frequency f and this phenomenon is independent of the nature of the input signal. This may f.i. be the case when a noise signal in the form of clics, contact interruptions, short or long noise bursts etc arrive at the input terminal IN of the system and cease suddenly. The amplifier A1 and the broadband filter are not limiting and will allow the passage of this noise signal which is fed via the resonant circuits F2i ($i = 1$ to 5) to the input terminals 1i of the tank circuits F2i ($i = 1$ to 5). Each of these resonant circuits will start oscillating at its respective tuned frequency f.i. ($i = 1$ to 5) upon the above noise signal being fed to its input terminals. The envelopes (1 to 5) of the amplitude of the output signals at the respective output terminals 3i ($i = 1$ to 5) will decay exponentially with the above time constant when the noise signal ceases. It has been found experimentally that these envelopes (e.g. curves 1 and 2) may be apart as far as 10 db in the designed system.

If at the instant t1 only the envelopes 1 and 2 have values situated above the threshold value Tr4 the 2 out of 5 check circuit 2/5 will operate and a time interval T' after this instant t1 two output signals would be provided at the outputs OUT1 and OUT2 since the time interval t2-t1 may be larger than the time interval T' which is necessarily limited. However, the action of the detection circuits DET2i will prevent this eroneous operation of the system. Indeed, from the curves 3', 4', 5' representing the envelopes of the decaying output signals taken at the highest level output terminals 4i ($i = 3, 4, 5$) respectively it can be derived that as long as the envelopes 1 and 2 are situated above Tr4 and since Tr4 and Tr1 are 10 dB apart at least one envelope 3' is situated above Tr1. In this case the transistor T13 in detection circuit DET23 (not shown) will become conductive and prevent the operation of the 2 out of 5 check circuit. The curves 1, 2, 3, 4, 5, 3', 4', 5' are parallel straight lines which means that the ratio $r$ of the quality factor Qi and the tuned frequency fi ($i = 1$ to 5) for each tank circuit is a constant value. Since 3'' represents the envelope of a decaying output signal at the output terminal (43) belonging to the tank circuit F13 (not shown), the ratio of the quality factor and associated tuned frequency of which is different from $r$. At the instant t3 the envelope 3'' is below Tr1 whilst the envelopes 1 and 2 are still above Tr4. In this case the 2 out 5 check circuit will operate since the detection circuits DET2i ($i = 3, 4, 5$) are unable to react. A time interval T' after the instant t3 output signals will be provided at the outputs OUT1 and OUT2 when the time interval t2-t3 is larger that T'. It is therefore necessary to have the values of ratio $r$ controlled. When all these ratios are equal, the system can be designed properly and as an additional feature the bandwidth of all tank circuits F1i ($i = 1$ to 5) will be equal. This is an interesting characteristic since the signalling frequencies in this system are only 120 Hz apart from each other.

Mainly referring to FIG. 3, the operation of the threshold circuits THR1 and THR4 will now be described.

1. Threshold circuit THR1.

Since transistor T11 (FIG. 2) becomes conductive when the base to emitter voltage difference is larger than its cut-in voltage, the total threshold voltage Tr1 is the sum of this cut-in voltage and the voltage developed across the resistance capacitance network R'34, C10 which is due to the rectified output signal at the output terminal (21) of tank circuit F11 (FIG. 2). Since also the tapping point (41) delivers an output signal which is larger than that at the tapping point (21) the transistor T11 will become conductive for a certain value of the output signal at the tapping point (41). The above cut-in voltage value can partially or totally be compensated by having the junction point of the resistors R'23 and R34 connected to a point the voltage of which is below the reference voltage value VZ8. From the above it follows that the threshold voltage is proportional to the voltage value of the output signal at the output terminal (21) and consequently also to the input signal at the input terminal (11) of the tuned circuit F11. This is a necessary measure since when the threshold voltage value would remain constant the bandwidth at this voltage value of the tuned circuit F11 would increase with an increasing input signal.

2. Threshold circuit THR4.

The following should be noted. Firstly, transistor T8 is conductive since its emitter and base are connected to battery via resistor R'19 and to the junction point of the resistors R'23 and R21 of the potentiometer circuit R'23, R21, R20 via resistor R23 respectively. Due to the voltage drop across the resistor R'23 the emitter voltage of the emitter follower T8 is below the reference voltage VZ8. Secondly, the voltage at the emitter of transistor T9 is held at a higher potential than that of its base by the clamping diode D6. Consequently transistor T9 is blocked. Transistor T'10 is conductive since its emitter is connected to battery via resistor R14. This emitter voltage will thus remain constant as long as transistor T9 is blocked. When transistor T9 becomes conductive due to the base voltage of transistor T8 having been sufficiently increased, the emitter voltage of transistor T'10 increases beyond the above mentioned constant voltage. Thirdly, the transistor T1 wherein base current flows via resistors R29, R'28, R27 and R26 is conductive. The capacitor C11 is thus charged at its emitter voltage which is smaller than the emitter voltage of transistor T8. A pulse applied at the base of transistor T8 will momentarily increase the base current in transistor T1 via diode D3, capacitors C8 and C11 whereby the charge and consequently the voltage across the latter capacitor increases. This causes a current pulse to flow via capacitor C12, resistor R89 and the parallel way constituted by capacitor C13 and diode D7 on the one hand and base emitter circuit of transistor T'10 and resistor R14 on the other hand. This causes a momentarily increase of the emitter voltage of transistor T'10 and consequently of the threshold voltage. Indeed, both capacitors C11 and C13 will be discharged, the first one via resistor R89 base emitter of transistor T'10 and resistor R14 and the second one via resistor R'31. It is hereby supposed that transistor T9 has not yet been rendered conductive. The circuit including transistor T1 and associated circuitry as described above is called hereinafter the impulsive noise circuit.

The operation of the threshold circuit THR4 will first be considered under steady state conditions i.e. when a normal signal having a frequency f1 is received. A DC voltage is then applied at the base of transistor T8 due to the action of rectifying circuit Re21 (FIG. 2) and the resistance capacitance filter network C9, R23 (FIG. 3). At the same time an output signal from the output terminal (31) is applied to the base of transistor T41 of the detection circuit DET11 (FIG. 2). When the voltage of this output signal increases above the earlier mentioned constant voltage at the emitter of transistor T'10, transistor T41 is rendered conductive. When the voltage of the output signal has increased above this constant voltage by a certain amount, transistor T9 becomes conductive due to the base voltage at transistor T8 having been sufficiently increased. From that moment on the threshold voltage value Tr4 increases with the output signal at the output terminal (31) and consequently also with input signal Under impulsive noise conditions the following happens. It is supposed that an input signal which is the superposition of a normal signal of frequency f1 and a noise pulse is unable to render transistor T9 conductive but gives an output signal at the output terminal (31) of the tank circuit F11 which is larger than the constant threshold voltage value. The voltage value of the normal signal at the output terminal (31) of tank circuit F11 may be smaller than the above constant threshold voltage value. By the action of the above threshold circuit the threshold voltage is momentarily increased as explained above so that transistor T41 remains blocked. If the above mentioned impulsive noise circuits were not present a false signal would be detected.

While the principles of the invention have been described above in connection with specific apparatus, it is to be clearly understood that this description is made only by way of example and not as a limitation on the scope of the invention.

What is claimed is:

1. A multiple-frequency signalling system including multiple-frequency receiver means coupled to receive a plurality of alternating signals having different frequencies, said receiver means including an evaluating circuit to evaluate the presence of a predetermined number of said signals received by said receiver means, said receiver means further including a plurality of channel paths each including a first tuned filter responsive to signals of a selected frequency and each including inhibiting means which render said channel paths ineffective upon spurious signals being applied to them, a said channel path being rendered effective when simultaneously said channel path receives a signal having a frequency equal to that to which the filter included in this channel path is tuned and said evaluating circuit determines that a said predetermined number of signals is present, the inhibiting means included in each of said channel paths including a detection circuit coupled between a second tuned filter included in this path and said evaluating circuit, the detection circuit including means for comparing a voltage value provided by the second filter with a threshold voltage value, said detection circuit providing an output when the difference between the compared voltages reaches a predetermined value, and the operation of said evaluating circuit being prevented by the output of said detection circuit, thus rendering said channel paths ineffective.

2. A multiple-frequency signalling system according to claim 1, including a common threshold circuit coupled between said tuned filters and said detection circuits and able to provide said threshold voltage value.

3. A multiple-frequency signalling system according to claim 1, in which each of said channel paths further includes a second detection circuit coupled between the tuned filter included in this channel path and an input terminal of said evaluating circuit, said system further including a second common threshold circuit coupled between said tuned filters and said second detection circuits and including means to produce a second threshold voltage value, said second detection circuit including means to compare said second threshold voltage value with a second voltage value provided by the filter to which said detection circuit is coupled and reacting when the difference between the compared voltage values reaches a second predetermined value, and when a said predetermined number of said second detection circuits reacts, said input terminal of said evaluating circuit is activated and consequently said evaluating circuit is enabled to operate.

4. A multiple-frequency signalling system according to claim 3, in which each of said first and second detection circuits reacts when said first and second voltage values provided by said filters are larger than said first and second threshold voltage values respectively.

5. A multiple-frequency signalling system according to claim 3, in which each of said channel paths includes means to block the first detection circuit thereof when the second detection circuit of this channel path is reacting.

6. A multiple-frequency signalling system according to claim 2, in which each of said channel paths further includes a rectifying circuit and a first output terminal of said first tuned filter is coupled to said first threshold circuit via said rectifying circuit to provide said first threshold voltage value.

7. A multiple-frequency signalling system according to claim 3, in which each of said channel paths further includes a second rectifying circuit and a second tuned filter feeding said signals to said first tuned filter and via said rectifying circuit to said second threshold circuit to provide said second threshold voltage value.

8. A multiple-frequency signalling system according to claim 3, in which said first and second detection circuits include respective first and second transistors, the emitters, bases and collectors of which are coupled to said first and second threshold circuits, to second and third output terminals of said first tuned filter and to a second and said first input terminals of said evaluating circuit respectively.

9. A multiple-frequency signalling system according to claim 8, in which said voltage value at said second output terminal is higher than any other voltage value at said first and third output terminals of said first filter.

10. A multiple-frequency signalling system according to claim 8, in which said first filter is a sharply tuned anti-resonant circuit including an inductor, a capacitor and a resistor and that first, second and third output terminals of said first filter are tapping points on said inductor.

11. A multiple-frequency signalling system according to claim 10, in which the quality factor of said tuned anti-resonant circuit is proportional to the frequency to which it is tuned.

12. A multiple-frequency signalling system according to claim 7, in which said second tuned filter is a series resonant circuit.

13. A multiple-frequency signalling system according to claim 8, in which said evaluating circuit has a third input terminal which is coupled to the input of said receiver means via a third rectifying circuit to enable the operation of said evaluating circuit, the first input terminal of which is coupled to the collector of each of said second transistors via an individual signal output circuit provided per channel path and able to activate said first input terminal of said evaluating circuit when a said predetermined number of second detection circuits reacts and to then pervent the operation of the first transistor forming part of the same channel path.

14. A multiple-frequency signalling system according to claim 13, in which said evaluating circuit includes an m-out-of-n check circuit and a time circuit which is operated a time interval after said m-out-of-n check circuit has evaluated said predetermined number of frequency signals and that each of said signal output circuits includes a bistate device the 1-input of which is connected to the output of individual gating means which are coupled to said second transistor and to said time circuit in such a manner that said bistate device is set to its 1-state when simultaneously a said second transistor is made conductive and said time circuit is operated.

15. A multiple-frequency signalling system according to claim 3, in which said first and second threshold voltage values are each constituted of a respective first and second fixed value and of a respective first and second variable value, said first and second variable values being functions of the voltage values of the frequency signals applied to said tuned filters.

16. A multiple-frequency signalling system according to claim 15, in which said first variable value is added to said first fixed value when said signal value at said third output terminal of said first filter is larger than a third voltage value larger than said first fixed voltage value.

17. A multiple-frequency signalling system according to claim 16, in which said first threshold circuit includes an impulsive noise circuit able to increase said second threshold voltage value when said signal voltage value is included between said first fixed value and said third voltage value.

18. A multiple-frequency signalling system according to claim 14, in which said inhibiting means further include means to render all said channel paths ineffective when said time circuit operates.

19. A multiple-frequency signalling system according to claim 18, in which said means include a diode coupled between said time circuit and said tuned filter to render all said channel paths ineffective by short circuiting said tuned filters included therein.

* * * * *